United States Patent
Okamoto

(10) Patent No.: US 7,242,184 B2
(45) Date of Patent: Jul. 10, 2007

(54) ROTATION ANGLE DETECTING APPARATUS AND METHOD THEREOF

(75) Inventor: Naoki Okamoto, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/434,223

(22) Filed: May 16, 2006

(65) Prior Publication Data

US 2006/0261805 A1   Nov. 23, 2006

(30) Foreign Application Priority Data

May 18, 2005   (JP)   ............................. 2005-145913

(51) Int. Cl.
*G01B 7/30*   (2006.01)
(52) U.S. Cl. ................................. 324/207.25
(58) Field of Classification Search ...................... None
See application file for complete search history.

(56) References Cited

U.S. PATENT DOCUMENTS 4,229,694 A * 10/1980 Wilson et al. .............. 324/772
7,138,795 B2 * 11/2006 Ura ....................... 324/207.25

FOREIGN PATENT DOCUMENTS

JP           9-133039 A      6/1997

* cited by examiner

*Primary Examiner*—Reena Aurora
(74) *Attorney, Agent, or Firm*—Foley & Lardner LLP

(57) ABSTRACT

A rotation angle signal from a rotation sensor for a rotating body is converted (first conversion) into a rotation angle detection value, based on a signal value of the rotation angle signal as is, and is converted (second conversion) to a rotation angle detection value based on a signal value for where a rotation angle signal has been amplified a predetermined number of times, and according to a rotation angle region, either one of a first converted rotation angle detection value, and a second converted rotation angle detection value, is selected and output as a final rotation angle detection signal. At at least two reference rotation angles, a first learning is performed for learning a conversion characteristic in the first conversion, based on; rotation angle detection values converted by the first conversion, and reference-rotation-angle-equivalent-values set beforehand, and at at least two optional rotation angles in a rotation angle region in which the rotation angle detection value of the second conversion is selected, a second learning is performed for learning a conversion characteristic in the second conversion, based on rotation angle detection values due to conversion by the first conversion which have been learned in the first learning, and the signal value amplified a predetermined number of times.

17 Claims, 14 Drawing Sheets

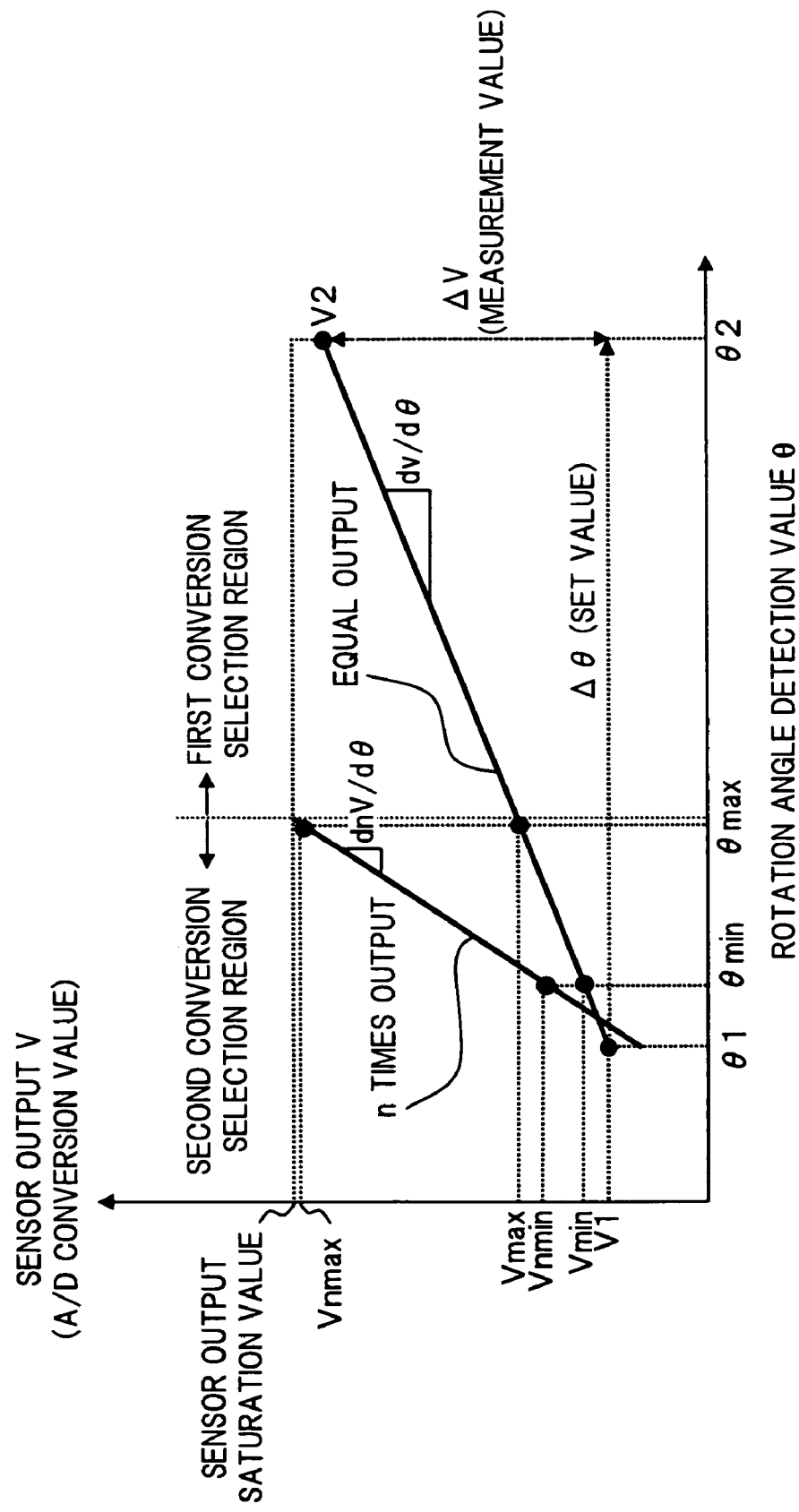

ROTATION ANGLE DETECTING APPARATUS AND METHOD THEREOF

BACKGROUND OF THE INVENTION

1. Field of the Invention

The present invention relates to an apparatus and method for detecting a rotation angle of a rotating body, and in particular, to a learning technique for improving detection accuracy.

2. Description of the Related Art

In Japanese Unexamined Patent Publication No. 9-133039, a technique for improving detection accuracy in a low throttle opening range is disclosed in which a signal from a throttle sensor (rotation angle sensor) that detects a throttle opening of an internal combustion engine, is directly input to a first A/D converter, and the sensor signal is amplified a predetermined number of times and input to a second A/D converter, and the amplified signal via the second A/D converter is used when the throttle opening is low, and the signal via the first A/D converter is used when the throttle opening is high.

Moreover, in the disclosed technique, in order to solve a problem where, when an amplification ratio of the amplifier differs from a calculated value, the throttle opening detection values vary and become discontinuous on the low opening side and the high opening side of a switching point of the output values of the respective A/D converters, the point of discontinuation can be resolved by finding the ratio of the output values for a predetermined opening, and correcting the amplification ratio according to this ratio.

However, in the above correction of the amplification, while variation in the amplifier can be learnt, variation in the sensor itself cannot be absorbed.

Furthermore, as shown in FIG. 2 of the above-mentioned Publication, since the amplified signal becomes saturated at an intermediate opening, there has been a problem in that a conversion characteristic (gain) between the sensor output and the rotation angle cannot be learnt.

SUMMARY OF THE INVENTION

Therefore, an object of the present invention is to be able to learn variations in both a sensor and an amplifier all together, and to be able to sufficiently improve rotation angle detection accuracy.

In order to achieve the above object, in accordance with the present invention, for at least two reference rotation angles, a first learning is performed for learning a conversion characteristic in a first conversion, based on; a rotation angle detection value for where a rotation angle detection signal from a rotation angle sensor is converted (first conversion) based on a signal value of the rotation angle detection signal as is, and a reference rotation angle equivalent value set beforehand, and for at least two arbitrary rotation angles in a rotation angle region where the rotation angle detection value of another conversion (second conversion) is selected, a second learning is performed for learning a conversion characteristic in the second conversion, based on a rotation angle detection value for the first conversion for which the first learning has been performed, and a signal value amplified a predetermined number of times.

The other objects and features of the present invention will become understood from the following description with reference to the accompanying drawings.

BRIEF DESCRIPTION OF THE DRAWINGS

FIG. 8 is a schematic block diagram showing a positioning relationship between the magnet, the signal yoke, the rectifying yoke, a Hall element, and so on.

FIG. 14 is a graphical view illustrating another setting example of the method of the learning control.

PREFERRED EMBODIMENT

Hereinafter, an embodiment of the present invention is described.

Figure 1:
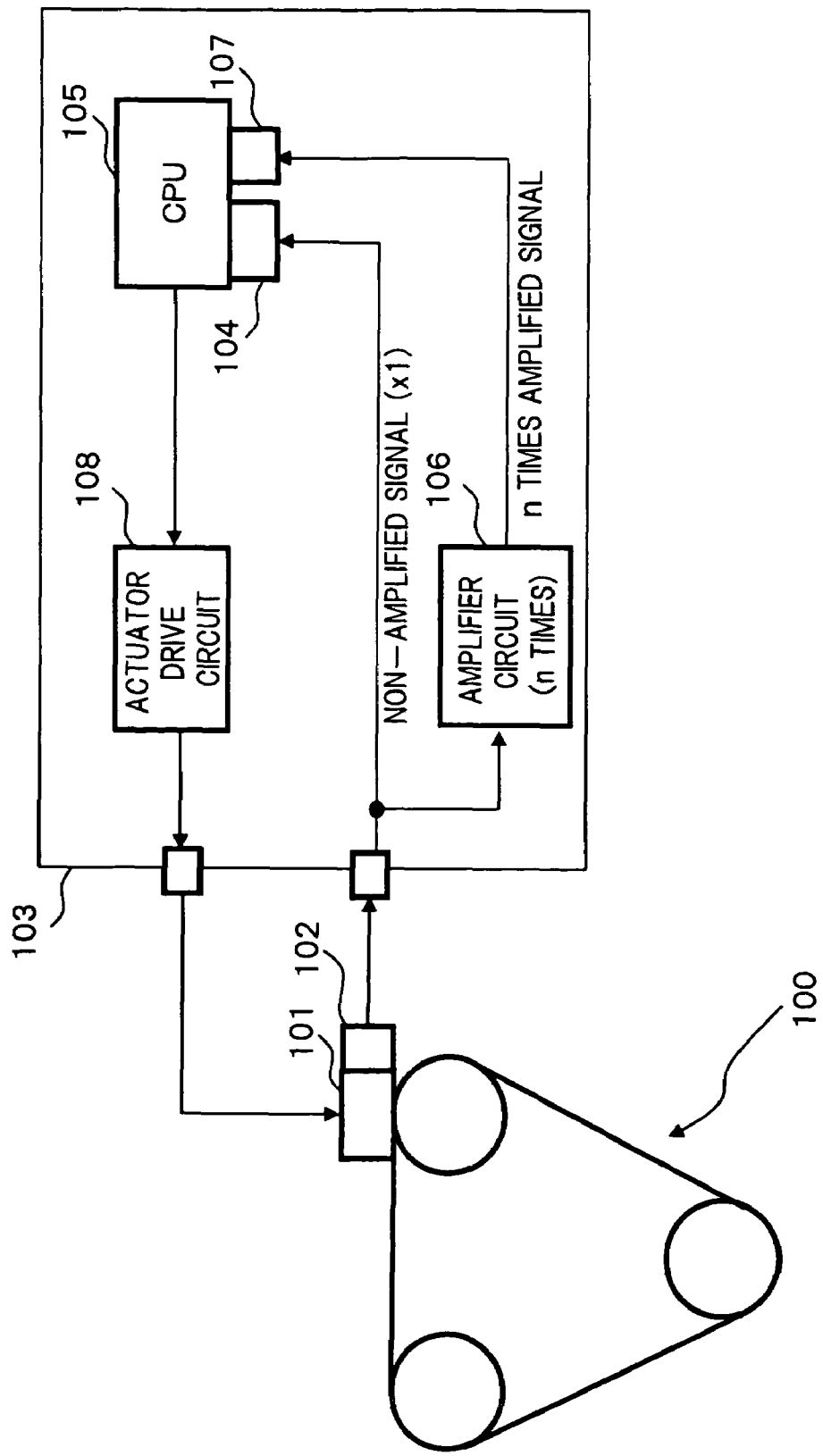
FIG. 1 is a diagrammatic view showing a system outline of an embodiment of the present invention.

FIG. 1 is a diagram showing a system outline of the present embodiment.

An engine (gasoline internal combustion engine) 100 is equipped with a variable valve operating mechanism 101 that continuously changes an operating angle and a valve lift amount of an intake valve. A rotation angle sensor 102 described later, which detects the above operating angle from a rotation angle of a control shaft of the variable valve operating mechanism 101, is attached to the variable valve operating mechanism 101. The variable valve operating mechanism may be one that continuously changes at least one of the operating angle and the valve lift amount.

A rotation angle signal detected by the rotation angle sensor 102 is inputted to a control unit 103 of the variable valve operating mechanism 101.

In the control unit 103, the rotation angle signal is directly inputted to a CPU 105 via a first A/D converter 104 which performs A/D conversion, and a rotation angle signal that has been amplified a predetermined number of times by an amplifier 106, is inputted to the CPU 105 via a second A/D converter 107 which performs A/D conversion. The first A/D converter 104 and the second A/D converter 107 may be integrally incorporated device within the CPU 105.

The CPU 105 processes the A/D conversion values from the first A/D converter 104 and the second A/D converter 107 and calculates a rotation angle detection value. In a region where the rotation angle of the control shaft (valve lift amount) is relatively small, selects and outputs the rotation angle detection value from the second A/D converter 107, which has been amplified a predetermined number of times, and in a region where the rotation angle of the control shaft is relatively large, it selects and outputs the rotation angle detection value from the first A/D converter 104.

Moreover, the CPU 105 generates a control signal for the variable valve operating mechanism 101 based on the rotation angle detection value selected in this way, and outputs it to an actuator drive circuit 108. A drive signal outputted by the actuator drive circuit 108 drives the variable valve operating mechanism 101, and feedback controls the operating angle and the valve lift amount of the intake valve to target values.

Figure 13:
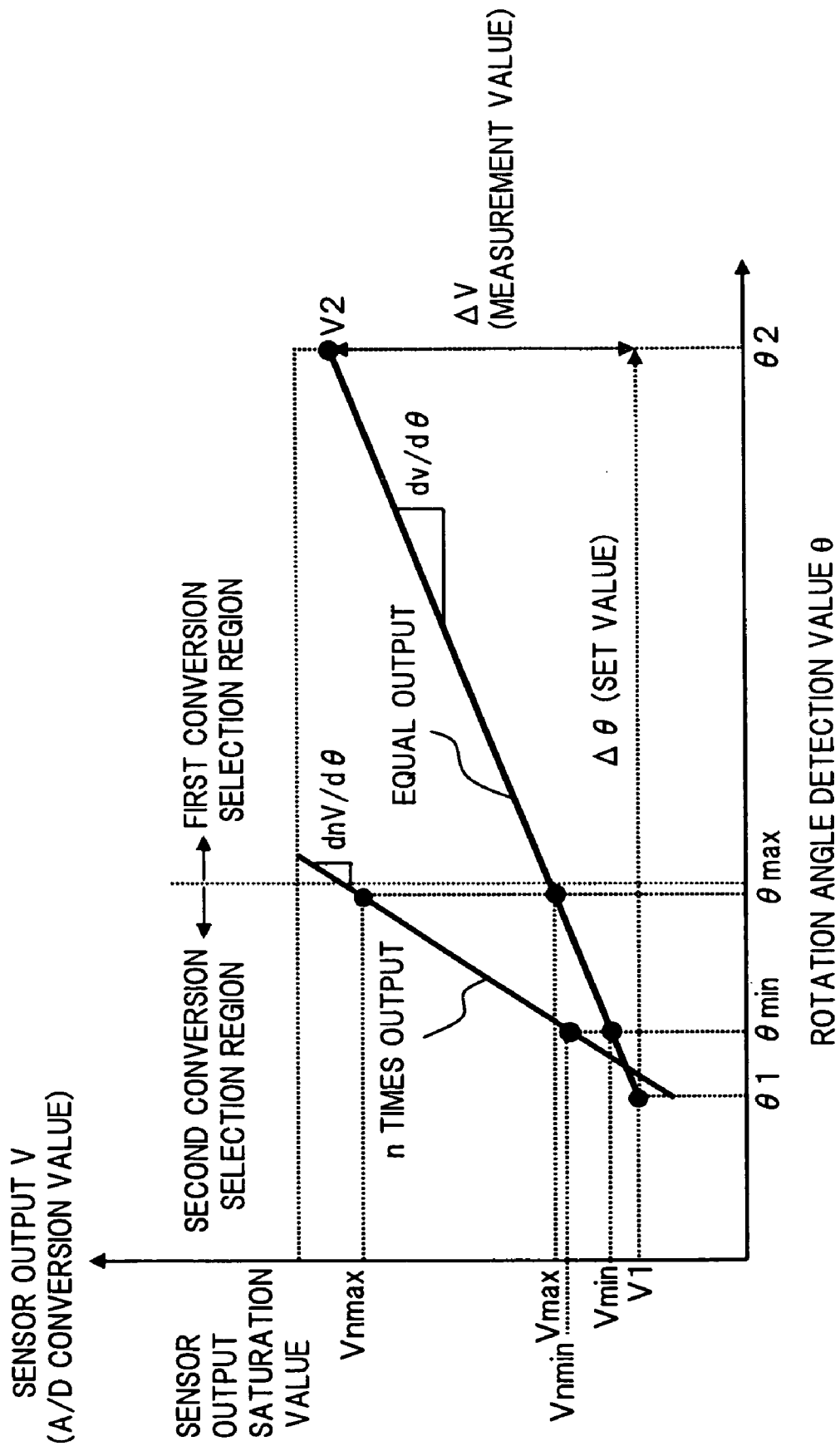
FIG. 13 is a graphical view illustrating a method of the learning control.

Here, for a region switching point in the selection of the rotation angle detection value, as shown in FIG. 13 described later, the rotation angle may be set to a rotation angle smaller than a rotation angle at which the rotation angle detection value from the second A/D converter 107 becomes a maximum output value (saturation point), or as shown in FIG. 14, it may be set to a rotation angle at which the rotation angle detection value from the second A/D converter 107 becomes a maximum output value (saturation point).

Figure 2:
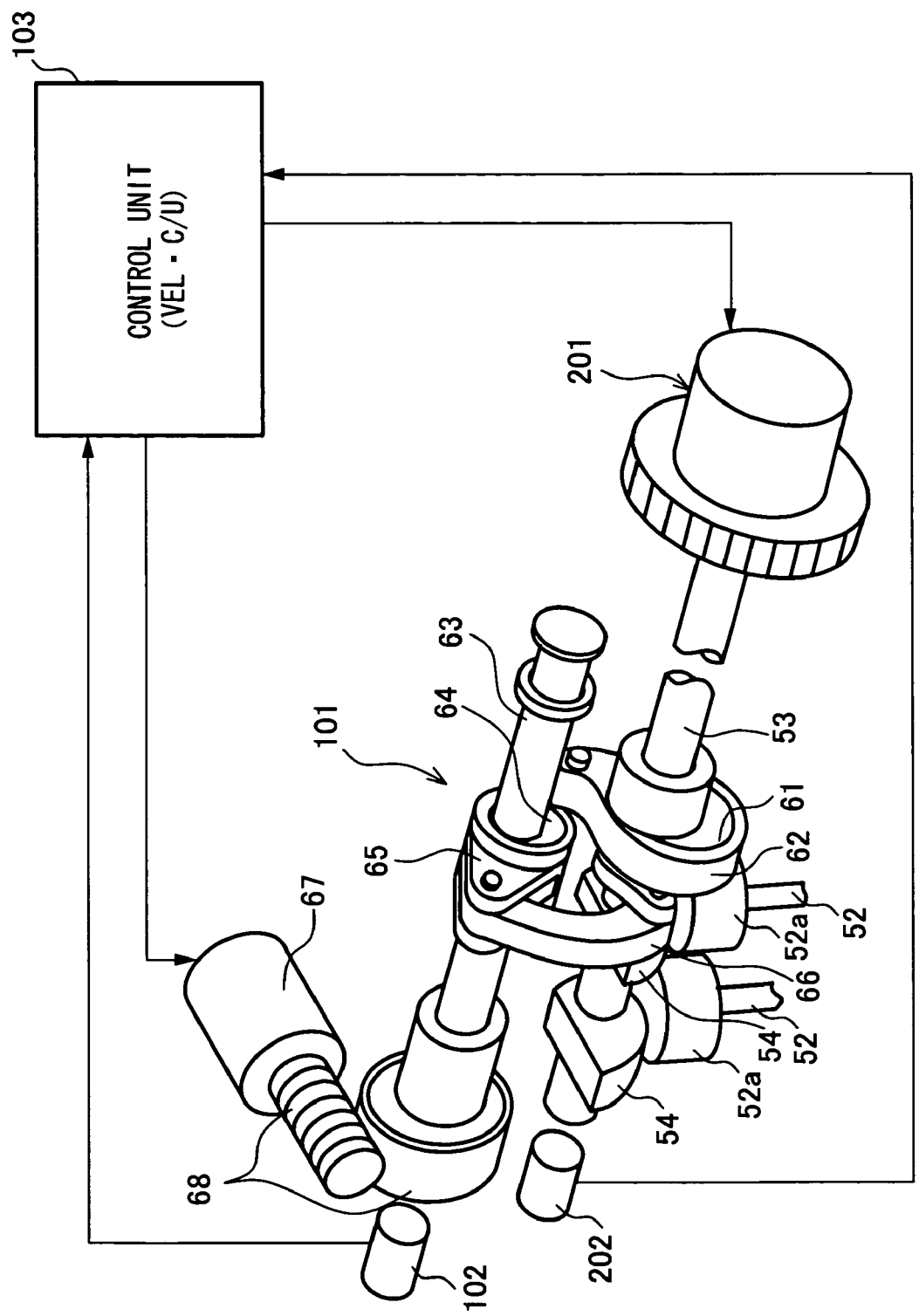
FIG. 2 is a perspective view showing a variable valve operating mechanism of the embodiment of the present invention.
Figure 3:
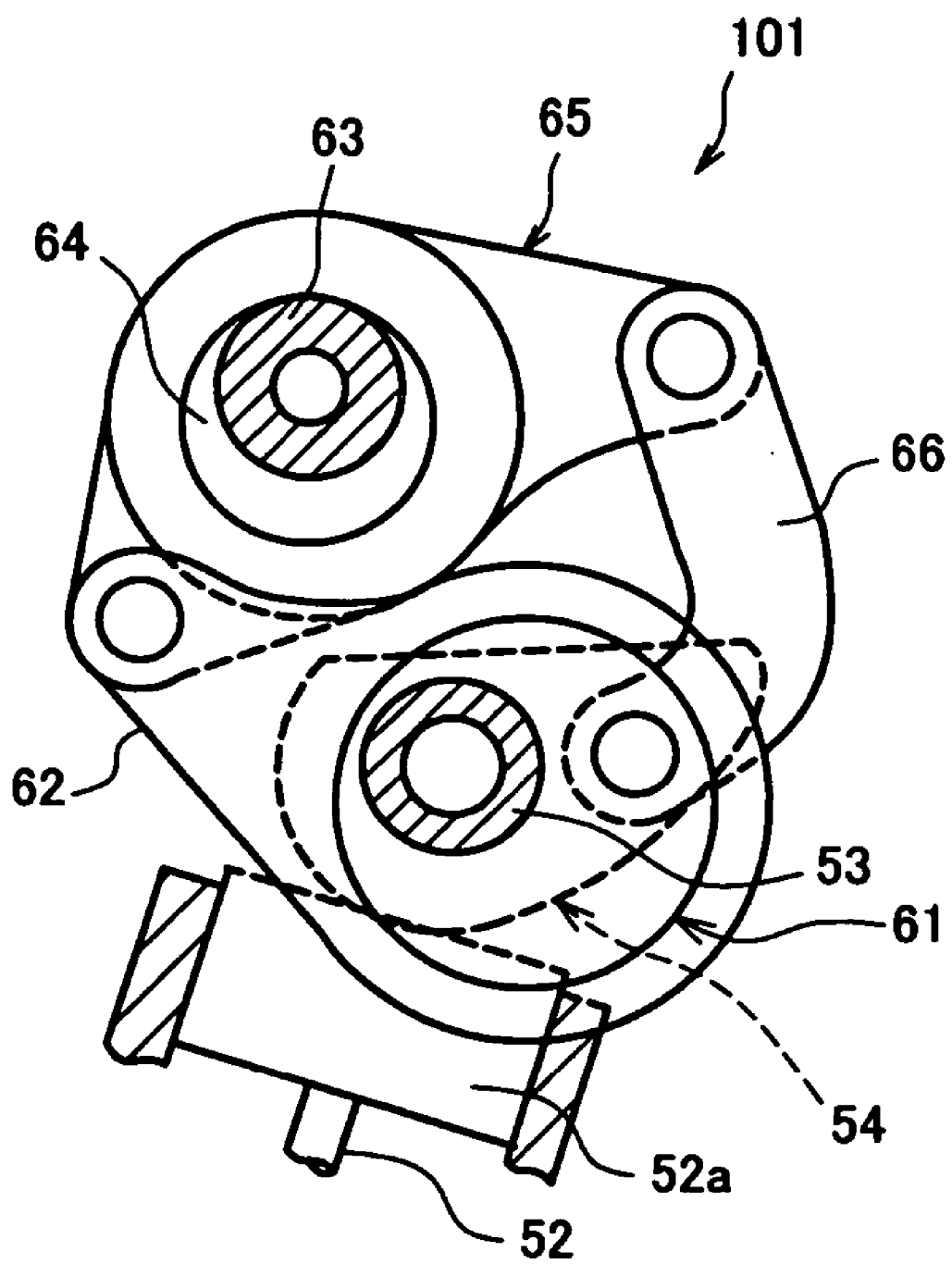
FIG. 3 is a sectional view of the variable valve operating mechanism shown in FIG. 2.

FIGS. 2 and 3 show a configuration of the variable valve operating mechanism.

In the above-mentioned engine 100, a pair of intake valves 52 is provided for each cylinder, and above these intake valves 52, an intake drive shaft 53 which is rotationally driven by a crankshaft (not shown in the diagram), is rotatably supported along the direction of the line of cylinders.

Rocking cams 54 that make contact with valve lifters 52a of the intake valves 52 and open/close-drive the intake valves 52, are fitted onto the intake drive shaft 53, so that the cams 54 can relatively rotate.

Between the intake drive shaft 53 and the rocking cams 54, is provided the variable valve operating mechanism 101 that continuously changes the operating angle and the valve lift amount of the intake valves 52.

Moreover, on one end part of the intake drive shaft 53 is provided a phase changing mechanism 201 which continuously changes the central phase of the operating angle of the intake valve 52, by changing the rotational phase of the intake drive shaft 53 with respect to the crankshaft. The rotational phase is controlled to a target value based on the rotational phase of the intake drive shaft 53 detected by a drive shaft sensor 202.

These variable valve operating mechanism 101 and rotational phase changing mechanism 201 constitute a variable valve operating mechanism that can simultaneously and independently change the valve timing and the lift amount (operating angle).

As shown in FIGS. 2 and 3, the variable valve operating mechanism 101 has; a circular shaped drive cam 61 that is fixedly and eccentrically mounted on the intake drive shaft 53, a ring shaped link 62 fitted onto this drive cam 61 so as to be able to relatively rotate, a control shaft 63 that extends in the cylinder line direction substantially in parallel with the intake drive shaft 53, a circular shaped control cam 64 that is fixedly and eccentrically mounted on the control shaft 63, a rocker arm 65 fitted onto the control cam 64 so as to be able to relatively rotate, and with one end thereof joined to the tip end of the ring shaped link 62, and a rod shaped link 66 that is joined to the other end of this rocker arm 65 and to the rocking cam 54.

For sake of conciseness, in FIG. 2, members that constitute the variable valve operating mechanism 101, namely, the drive cam 61, the ring shaped link 62, the control shaft 63, and the control cam 64 are described only for one of the pair of the intake valves 52.

The control shaft 63 is rotationally driven within a predetermined control range by an electric actuator 67 (motor) through a gear train 68.

According to the above configuration, when the intake drive shaft 53 rotates in association with the crankshaft, the ring shaped link 62 moves substantially translationally via the drive cam 61, and with this, the rocker arm 65 oscillates about the central axis of the control cam 64, and the rocking cam 54 oscillates via the rod shaped link 66, and drives the intake valve 52 to open and close.

Moreover, by changing the rotation angle of the control shaft 63 by the electric actuator 67, the position of the central axis of the control cam 64 that is the center of oscillation of the rocker arm 65, changes so that the attitude of the rocking cam 54 changes.

As a result, the operating angle and the valve lift amount of the intake valve 52 continuously change, while the central phase of the operating angle of the intake valve 52 remains substantially constant.

FIGS. 4 through 11 show the configuration and operation of the above rotation angle sensor 102.

Figure 4:
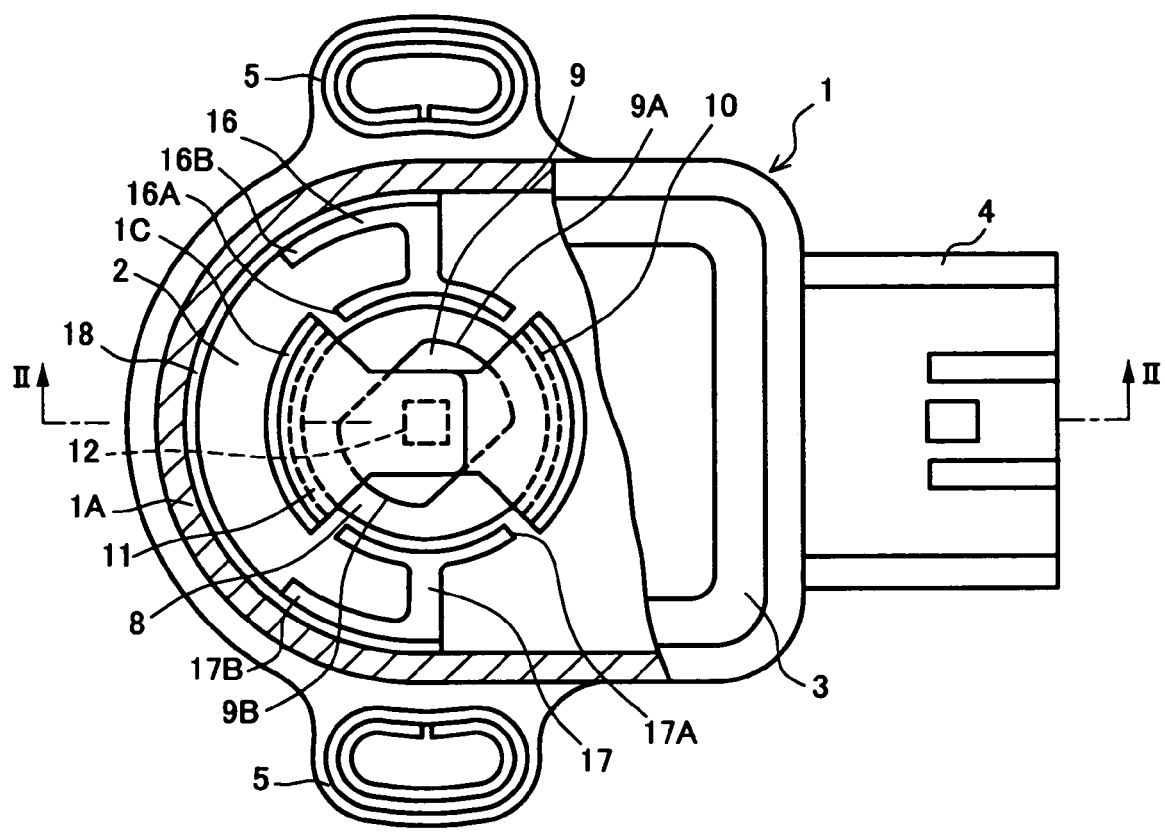
FIG. 4 is a partially cutaway front view showing a rotation angle sensor of the embodiment.
Figure 5:
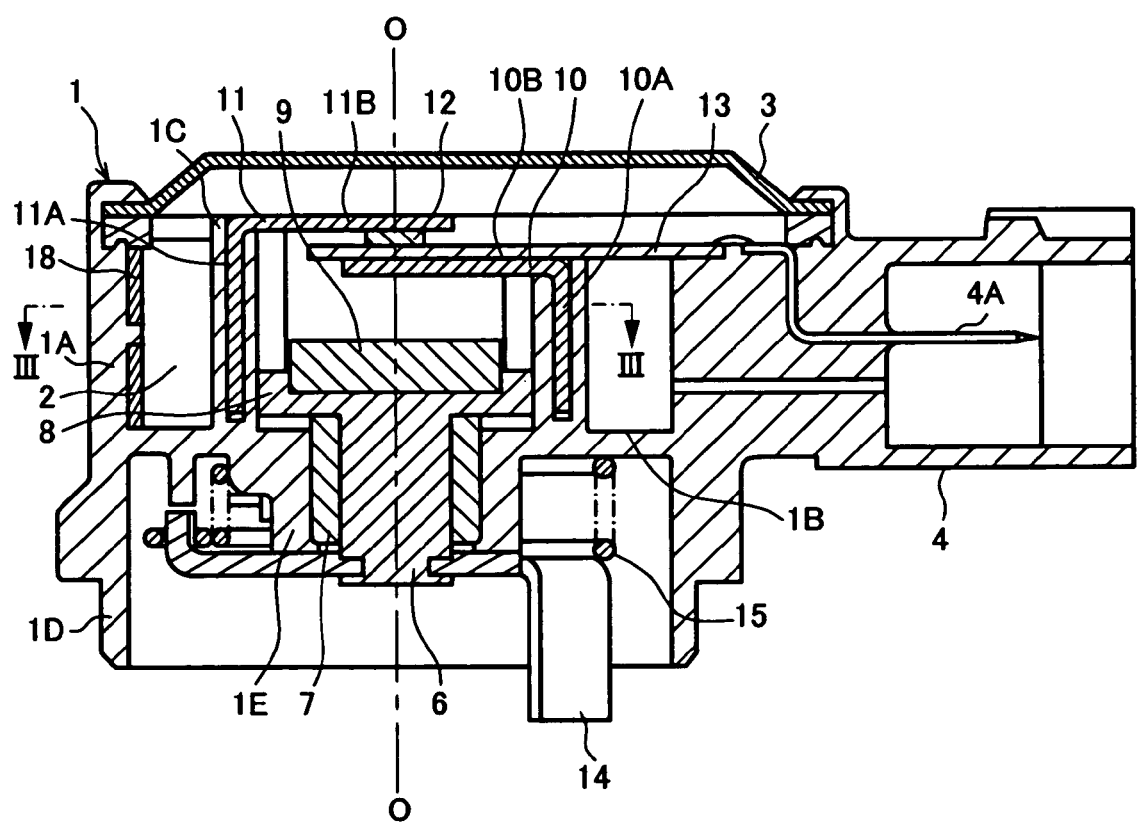
FIG. 5 is a longitudinal sectional view of the rotation angle sensor seen in the direction of the arrows II—II in FIG. 4.

A casing 1 that forms an outer shell of the rotation angle sensor, as shown in FIGS. 4 and 5, is integrally formed as a bottom ended substantially cylindrical body from resin material or the like, and mainly comprises; a substantially cylindrical peripheral wall portion 1A, a bottom surface portion 1B that forms a bottom surface of the peripheral wall portion 1A, a yoke holding portion 1C that is positioned on the inner peripheral side of the peripheral wall portion 1A and protrudingly provided on the bottom surface portion 1B and holds pole pieces 10A and 11A of signal yokes 10 and 11 described later, a cylindrical bottom portion 1D that extends from the outer peripheral side of the bottom surface portion 1B towards the opposite side of the peripheral wall portion 1A in the axial direction, and a cylindrical shaped bearing holding portion 1E that is projectingly provided on the central side of the bottom surface portion 1B.

Here, on the inner peripheral side of the peripheral wall portion 1A is provided a recessed space 2 that houses a magnet 9, the signal yokes 10 and 11, a Hall element 12, rectifying yokes 16 and 17, a magnetic connection plate 18, and the like. The recessed space 2 is blocked off by a plate shaped cover body 3. Moreover, on the outer peripheral side of the peripheral wall portion 1A is provided a connector 4 that is connected to the control unit 103, and attachment flanges 5 that are suited for being attached to an external attachment location. A plurality of pin terminals 4A extending from the inside of the recessed space 2 to the outside is provided inside the connector 4 (only one pin terminal is shown in the diagram).

A rotation shaft 6 rotatably provided in the casing 1, is fitted inside the bearing holding portion 1E using a bearing 7, and is extended passing through the bottom surface portion 1B, and rotates about the axis O—O (central axis O) in FIG. 5 as the center. One end side of the rotation shaft 6 projects toward outside of the recessed space 2, and a lever 14 is fitted to this projection end side. Moreover, the other end side of the rotation shaft 6 projects toward inside the recessed space 2, and a substantially disk shaped rotation plate 8 is integrally formed on this projection end side.

The magnet 9 is positioned in the casing 1 and is fixed atop the rotation plate 8. It is formed from a rectangular or oval shaped plate, and extends radially to both sides with respect to the axial line O—O of the rotation shaft 6, and is formed with a predetermined thickness in the axial direction. Furthermore, regarding the magnet 9, the two sides in the radial direction have arcuate surface portions 9A and 9B which extend in a circular arc shape with the central axis O as the center, and for example, one arcuate surface portion 9A becomes an N pole and the other arcuate surface portion 9B becomes an S pole.

The above signal yokes 10 and 11 are formed from magnetic metal material or the like, and are positioned inside the recessed space 2, and arranged so that they surround the magnet 9 from both sides in the diameter direction, and they work together with the Hall element 12 to detect the rotation angle of the magnet 9.

Figure 6:
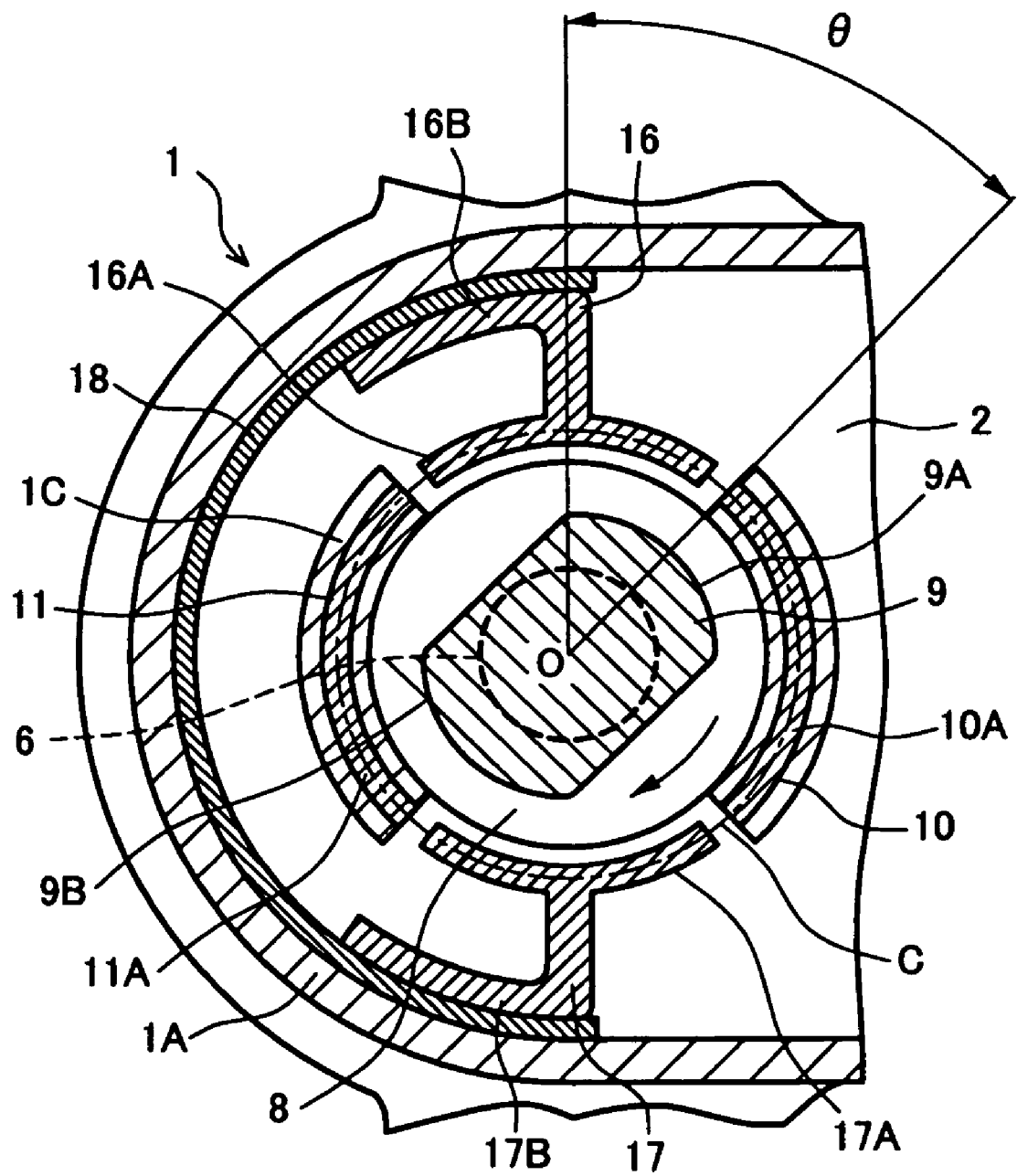
FIG. 6 is a partially enlarged sectional view of a magnet, a signal yoke, a rectifying yoke and the like, seen in the direction of the arrows III—III in FIG. 5.
Figure 7:
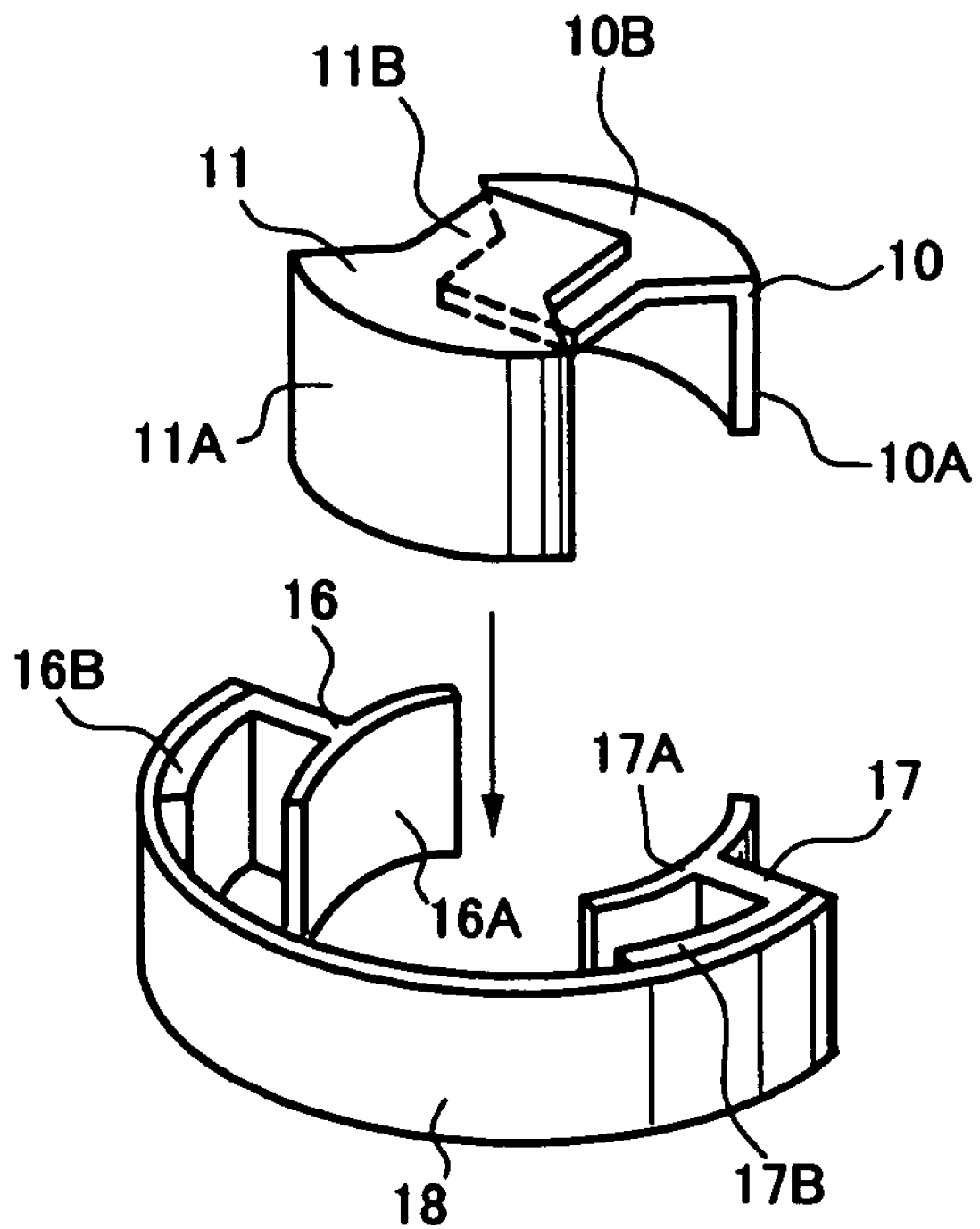
FIG. 7 is a perspective view showing the signal yoke, the rectifier yoke, and a magnetic connection plate.

Here, as shown in FIGS. 6 and 7, the signal yoke 10 is configured with a pole piece 10A that extends in a circumferential direction about the central axis O of the rotation shaft 6, and is formed in a circular arc shape with a predetermined angle (for example, approximately 90°), and an overhang part 10B that is formed in a condition bent radially inward from the pole piece 10A, and that extends to a position covering the top side of the magnet 9. Moreover, the signal yoke 11 is similarly configured with a circular arc shaped pole piece 11A, and an overhang part 11B.

In this case, the pole pieces 10A and 11A are arranged along the circumference C with the central axis O in FIG. 6 as the center, and are distanced away from each other in the diametrical direction, and extend by a predetermined dimension in the axial direction. The pole pieces 10A and 11A are configured such that one of the pole pieces 10A opposes the arcuate surface portion 9A of the magnet 9 with a radial gap, and the other one of the pole pieces 11A opposes the arcuate surface portion 9B with a radial gap, and the opposing areas in these two positions change in proportion to the rotation angle θ of the magnet 9.

Figure 8:
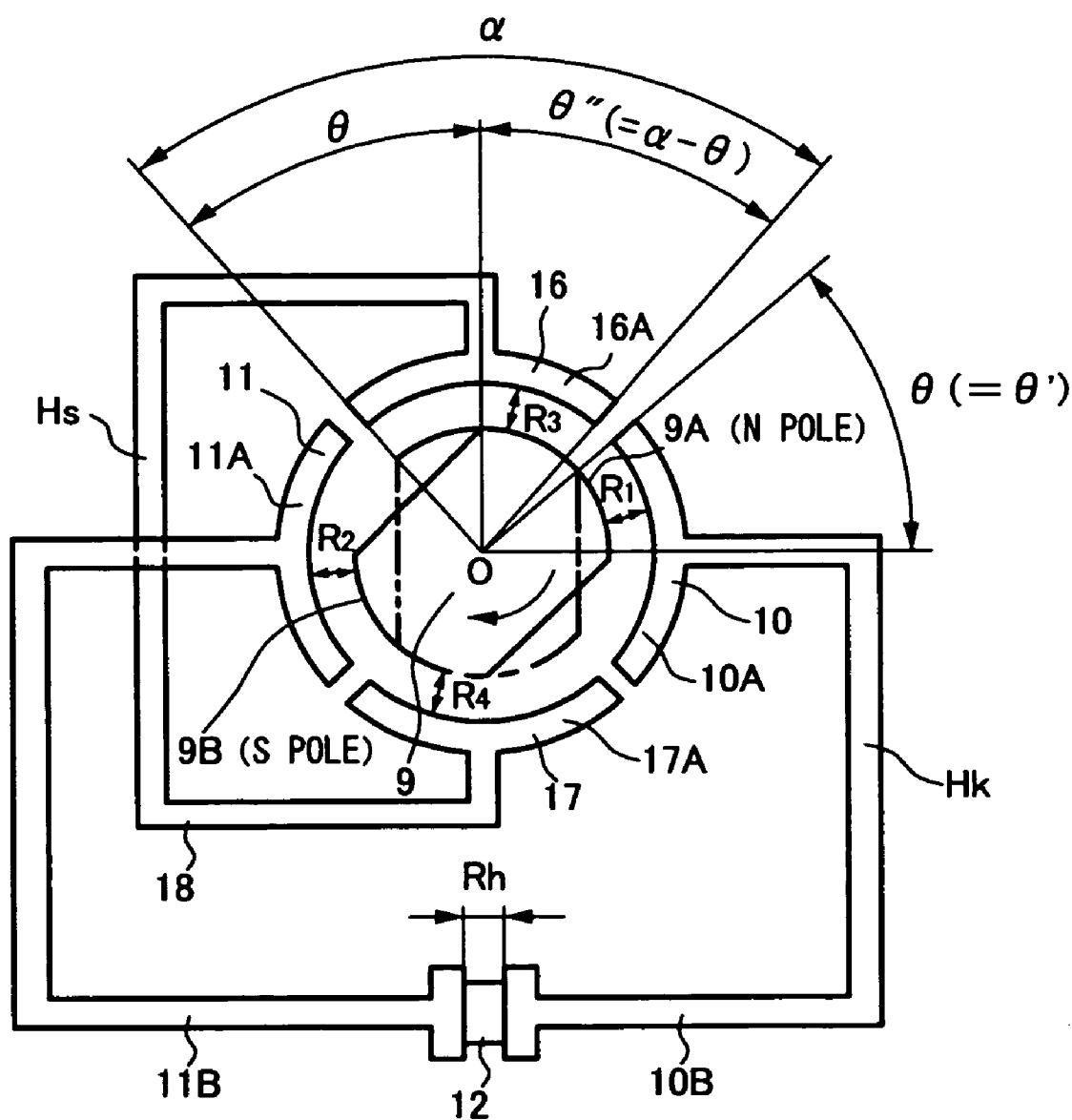
Figure 9:
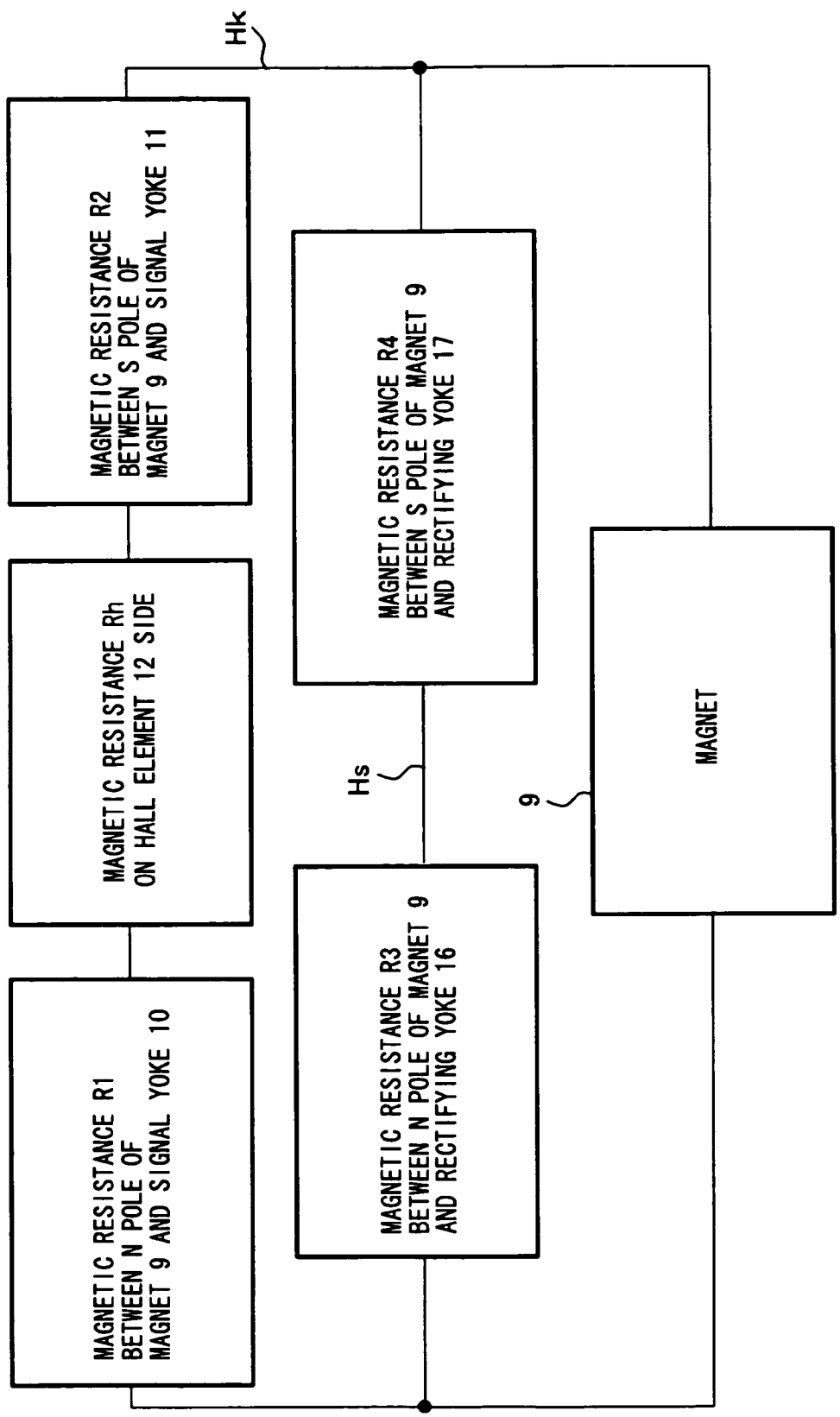
FIG. 9 is a circuit diagram showing a magnetic path for detection and a magnetic path for rectification of the rotation angle sensor, as equivalent magnetic circuits.

Furthermore, as shown in FIG. 5, the overhang parts 10B and 11B are arranged so that they overlap each other with a gap in the axial direction, and the Hall element 12 is arranged between them. As a result, as shown in FIGS. 8 and 9, a closed magnetic path for detection (hereinafter referred to as detection magnetic path Hk) via the signal yokes 10 and 11 and the Hall element 12 is formed between the N pole and the S pole of the magnet 9.

As shown in FIGS. 4 and 5, the Hall element 12 is mounted on a substrate 13 provided in the casing 1, and when the magnetic flux density in the detection magnetic path Hk changes according to the opposing areas of the magnet 9 and the signal yokes 10 and 11, it detects this magnetic flux density and outputs a detection signal to the control unit 103 from the connector 4.

The above mentioned lever 14 projects from the rotation shaft 6 in the radial direction, and the projection end side engages with a lever (not shown in the diagram) on the side of the control shaft 63 of the variable valve operating mechanism 101. Moreover, a return spring 15 that biases the magnet 9 towards an initial position (position where the rotation angle θ is zero) is fitted to the lever 14.

When the control shaft 63 is rotated by the drive of the afore-mentioned variable valve operating mechanism 101, the movement is transmitted to the rotation shaft 6 via the lever 14, and as a result of the rotation shaft 6 rotating together with the magnet 9 against the return spring 15, the opposing area (magnetic flux density) between the magnet 9 and the signal yokes 10 and 11 changes, and this change in the magnetic flux density is detected as a rotation angle (operating angle of the intake valve) of the control shaft 63 by the Hall element 12.

A pair of rectifying yokes 16 and 17 formed from magnetic material or the like, rectifies the magnetic flux passing through the signal yokes 10 and 11, by absorbing magnetic flux (leaked magnetic flux) generating from the location on the magnet 9 that does not oppose to the signal yokes 10 and 11.

As shown in FIGS. 6 and 7, the rectifying yokes 16 and 17 are positioned in the casing 1 and set between the signal yokes 10 and 11, and are arranged so as to surround the magnet 9 from both sides in the diametrical direction, and are attached inside the casing 1 via the magnetic connection plate 18.

Moreover, the rectifying yoke 16 is configured with a pole piece 16A formed in a circular arc shape through an angle (central angle) of, for example, 70 through 90° with the central axis O of the rotation shaft 6 as the center, and with a substantially L-shaped connection part 16B that projects from the outer peripheral side of the pole piece 16A, and that is connected to the magnetic connection plate 18. Moreover, the rectifying yoke 17 is similarly configured with a circular arc shaped pole piece 17A and a connection part 17B.

The pole pieces 16A and 17A are set in positions that fill in the gaps between the signal yokes 10 and 11 (pole pieces 10A and 11A) on the circumference C in FIG. 6, and extend in the circumferential direction from this position along the circumference C, and have predetermined dimensions in the axial direction. As a result, the four pole pieces 10A, 11A, 16A and 17A are arranged side by side in a substantially hollow cylindrical shape, and surround the entire periphery of the magnet 9.

The pole pieces 16A and 17A are configured such that when the magnet 9 rotates, one of the pole pieces, i.e., the pole piece 16A opposes the arcuate surface portion 9A of the magnet 9 with a gap in the radial direction, and the other pole piece 17A opposes the arcuate surface portion 9B with a gap in the radial direction, and the opposing areas in these two positions change in proportion to the rotation angle θ of the magnet 9.

The magnetic connection plate 18 provided as a connection member in the recessed space 2 of the casing 1, is formed from a magnetic metal plate or the like that has been bent in a circular arc shape or a C-shape, and is fixed inside the casing 1 by means of resin molding or the like, and extends along the outer peripheral side of the signal yoke 11, the rectifying yokes 16 and 17 and so on, in the circumferential direction. Moreover, the connection parts 16B and 17B of the rectifying yokes 16 and 17 are fixed and connected to both end sides of the magnetic connection plate 18.

As a result, as shown in FIGS. 8 and 9, a closed magnetic path for rectifying (hereinafter referred to as rectifying magnetic path Hs) via the rectifying yokes 16 and 17 and the magnetic connection plate 18 is formed between the N pole and the S pole of the magnet 9. This rectifying magnetic path Hs is arranged in parallel with the detection magnetic path Hk, with respect to the magnet 9.

Moreover, regarding the magnetic flux generating from the magnet 9, the magnetic flux generating in the region where the signal yokes 10 and 11 oppose each other, passes through the detection magnetic path Hk, and the magnetic flux generated in the region where the signal yokes 10 and 11 do not oppose each other, passes through the rectifying magnetic path Hs. Consequently, the rectifying yokes 16 and 17 cooperatively act with the magnetic connection plate 18 to rectify magnetic field of the magnet 9, and set the amount of magnetic flux that passes through the detection magnetic path Hk so as to change in proportion to the opposing area of the magnet 9 and the signal yokes 10 and 11.

Here, a description of the relationship between the magnetic flux passing through the detection magnetic path Hk and the rectifying magnetic path Hs, and the rotation angle θ of the magnet 9 is provided.

First, as shown in FIGS. 8 and 9, the detection magnetic path Hk can be regarded as a magnetic circuit in which a magnetic resistance R1 between the arcuate surface portion 9A (N pole) of the magnet 9 and the pole piece 10A of the signal yoke 10, a magnetic resistance R2 between the arcuate surface portion 9B (S pole) of the magnet 9, and the pole piece 11A of the signal yoke 11, and a magnetic resistance Rh between the overhang parts 10B and 11B in the position facing the Hall element 12, are connected in series.

Moreover, the magnetic resistance R1 on the signal yoke 10 side is expressed by the following formula (1) using the opposing area A of the arcuate surface portion 9A and the pole piece 10A, and a dimension G of the air gap positioned between them.

$$R1 = G/A \tag{1}$$

Moreover, the opposing area A is expressed by the following formula (2), where D is the outside diameter of the arcuate surface portions 9A and 9B of the magnet 9, t is the thickness of the magnet 9 in the axial direction, and an opposing angle θ' is an angle (central angle) at which the arcuate surface portion 9A and the pole piece 10A are opposed with the central axis O as the center.

$$A = \pi \cdot D \cdot t \cdot \theta'/360 \tag{2}$$

In this case, for example, if the rotation angle of the magnet 9 (for example, the position denoted by an imaginary line in FIG. 8), where the opposing angle θ' between the arcuate surface portions 9A and 9B of the magnet 9, and the signal yokes 10 and 11 is zero, is set as an initial position of the magnet 9, the opposing angle θ' is equal to the rotation angle θ of the magnet 9. As a result, replacing θ' with θ and substituting the above formula (2) into the formula (1), the following formula (3) is obtained.

$$R1 = (360 \cdot G)/(\pi \cdot D \cdot t \cdot \theta) \tag{3}$$

Moreover, since the signal yokes 10 and 11 are arranged on both sides of the magnet 9 in the diametrical direction, the magnetic resistance R2 on the signal yoke 11 side becomes equal to the magnetic resistance R1 (R2=R1). Since the magnetic resistance Rh is a constant value with respect to the rotation angle θ, the magnetic resistance Rk of the entire detection magnetic path Hk is expressed by the following formula (4).

$$\begin{aligned} Rk &= R1 + R2 + Rh \\ &= 2 \cdot R1 + Rh \\ &= 720 \cdot G / (\pi \cdot D \cdot t \cdot \theta) + Rh \end{aligned} \tag{4}$$

As a result, as can be seen from formula (4), the permeance (1/Rk) of the entire detection magnetic path Hk, which is an inverse of the magnetic resistance Rk, changes in a condition that is nearly a linear function with respect to the rotation angle θ of the magnet 9. For example, it changes almost linearly with respect to the rotation angle θ as shown by the characteristic line 19 indicated by the solid line in FIG. 10. Consequently, it is apparent that the magnetic flux passing through the detection magnetic path Hk increases and decreases substantially proportionally accompanying changes in the rotation angle θ.

On the other hand, to describe the magnetic flux in the rectifying magnetic path Hs, this rectifying magnetic path Hs can be regarded as a magnetic circuit in which the magnetic resistance R3 between the arcuate surface portion 9A of the magnet 9 and the pole piece 16A of the rectifying yoke 16, and the magnetic resistance R4 between the arcuate surface portion 9B of the magnet 9 and the pole piece 17A of the rectifying yoke 17, are connected in series.

Moreover, the magnetic resistance R3 on the side of the rectifying yoke 16 is expressed similarly to the above formula (3) by the following formula (5), using the outer diameter D and the thickness t of the magnet 9, a dimension G of the air gap, and an opposing angle θ" between the arcuate surface portion 9A and the pole piece 16A.

$$R3 = 360 \cdot G/((\pi \cdot D \cdot t \cdot \theta'')) \tag{5}$$

Here, if the central angle of the rectifying yoke 16 is α, the opposing angle θ" as can be seen in FIG. 8, is expressed by the following formula (6) using this central angle θ and the rotation angle θ of the magnet 9.

$$\theta'' = \alpha - \theta \tag{6}$$

Moreover, since the magnetic resistance R4 on the side of the rectifying yoke 17 is equal to the magnetic resistance R3 (R4=R3), the magnetic resistance Rs of the entire rectifying magnetic path Hs is expressed by the following formula (7).

$$\begin{aligned} Rs &= R3 + R4 \\ &= 2 \cdot R3 \\ &= 720 \cdot G / \{\pi \cdot D \cdot t \cdot (\alpha - \theta)\} \end{aligned} \tag{7}$$

Figure 10:
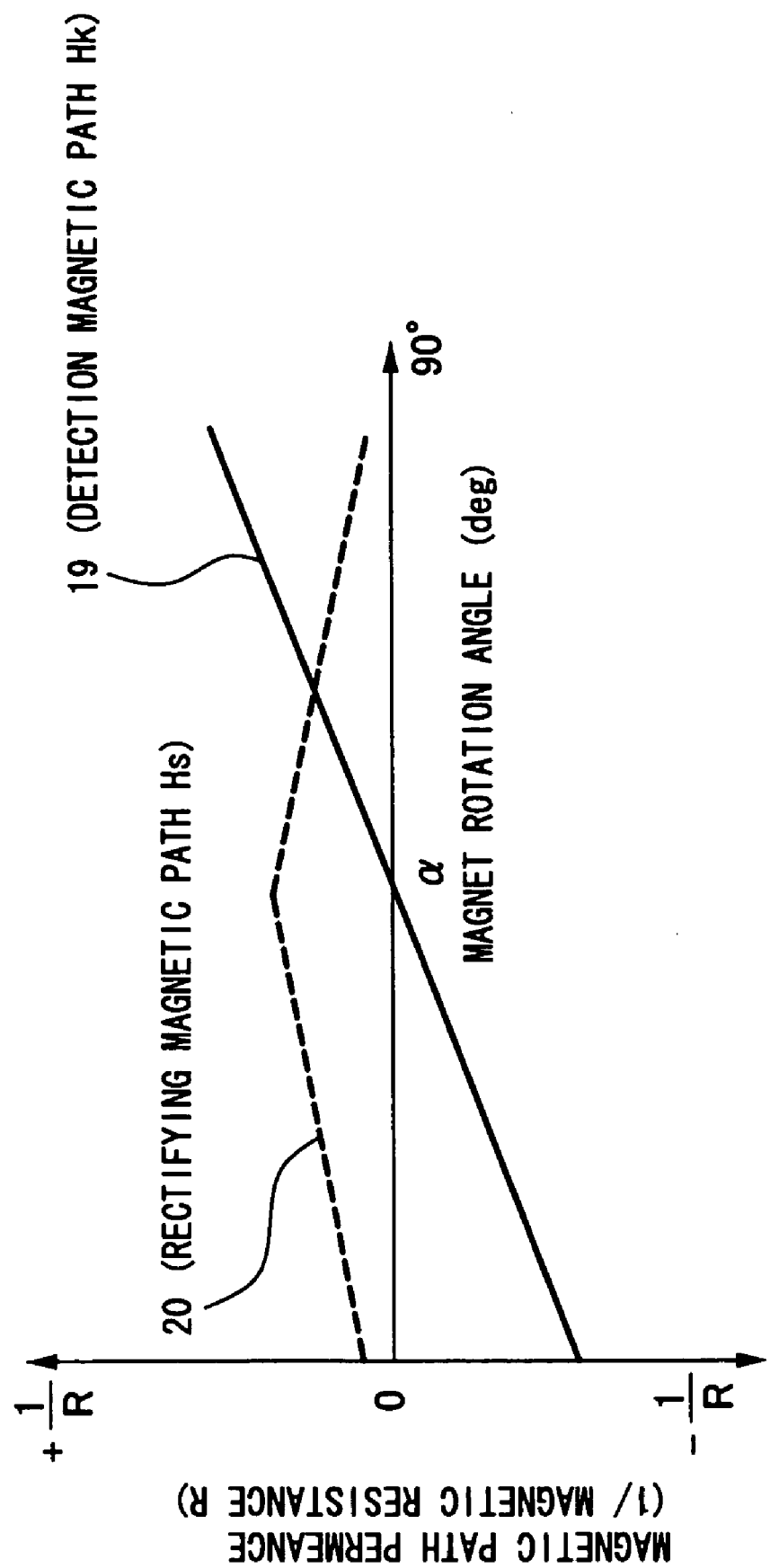
FIG. 10 is a diagrammatic view showing a characteristic relationship between rotation angle of the magnet, and permeance of the magnetic path for detection and the magnetic path for rectification.
Figure 11:
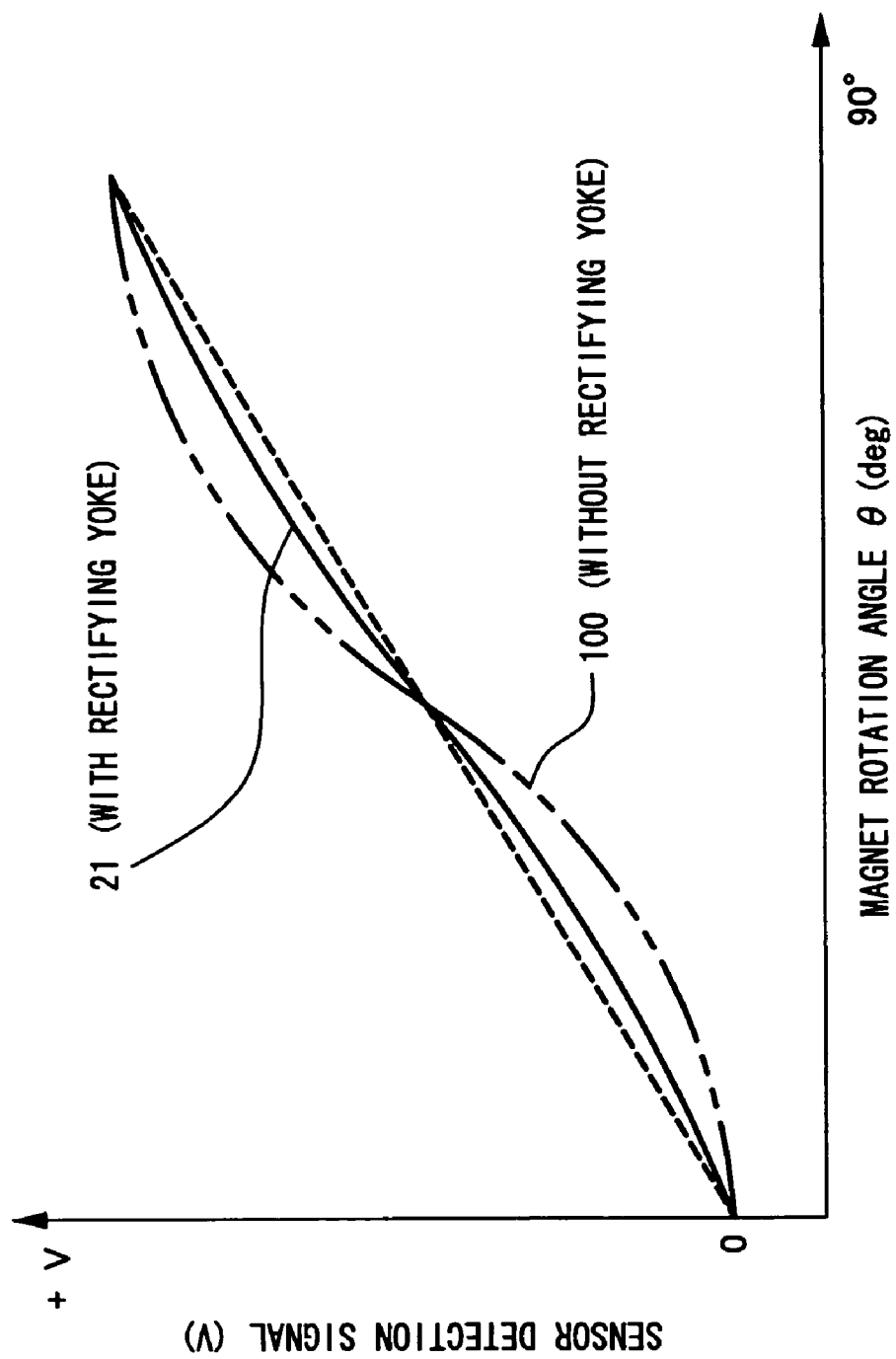
FIG. 11 is a graphical view showing a characteristic relationship between rotation angle of the magnet, and a detection signal of the sensor.

As a result, the permeance (1/Rs) of the entire rectifying magnetic path Hs when found from the above formula (7), becomes the mountain shaped characteristic line 20 that peaks at a position where the rotation angle θ of the magnet 9 is equal to α for example, as shown by the dotted line in FIG. 10. Consequently, it will be understood that the magnetic flux passing through the rectifying magnetic path Hs increases/decreases in a mountain shape according to changes in the rotation angle θ.

Here, in a case where for example the rectifying yokes 16 and 17 are not arranged between the signal yokes 10 and 11, the leaked magnetic flux generating from the magnet 9 between the signal yokes 10 and 11 from the magnet 9 becomes a floating state and is likely to penetrate the detection magnetic path Hk. This penetration phenomenon corresponds to a state where the permeance (1/Rs) of the rectifying magnetic path Hs has been added to the permeance (1/Rk) of the above mentioned detection magnetic path Hk.

As a result, in the case where the rectifying yokes 16 and 17 are not arranged, the permeance of the detection magnetic path has a nonlinear characteristic in which for example the two characteristic lines 19 and 20 shown in FIG. 10 are added. Therefore, the detection signal outputted by the rotation angle sensor corresponding to this permeance characteristic is likely to become a nonlinear output characteristic that has been significantly distorted into an S-shape with respect to the rotation angle of the magnet, as shown for example by the characteristic line 100 indicated by the imaginary line in FIG. 11.

In contrast, according to the rotation angle sensor of the present embodiment, the leaked magnetic flux leaked by the rectifying yokes 16 and 17 and the magnetic connection plate 18 can be absorbed within the rectifying magnetic path Hs. Therefore, the permeance characteristic (characteristic line 20) belonging to the rectifying magnetic path Hs due to of the leaked magnetic flux, can be separated from the permeance characteristic (characteristic line 19) belonging to the detection magnetic path Hk, which has a linear characteristic with respect to the rotation angle θ of the magnet 9. Hence, the permeance characteristic of the detection magnetic path Hk can be prevented from being distorted by some leaked magnetic flux.

As a result, when a detection signal corresponding to the permeance characteristic of the detection magnetic path Hk is outputted by the rotation angle sensor as shown for example by the characteristic line 21 indicated by the solid line in FIG. 8, the detection signal can be changed substantially proportionally corresponding to the rotation angle θ of the magnet 9. As a result, distortion, discrepancies, and the like of the characteristic line 21 can be minimized, and the detection signal can exhibit an almost linear output characteristic.

In this rotation sensor, there is a problem in that the conversion characteristic (gain) of the rotation angle and the sensor output varies from a design value, due to manufacturing differences during production or deterioration during usage, so that the true rotation angle cannot be detected. In particular, a non-contact type rotation angle sensor mentioned in the above embodiment that employs a magnetoelectric conversion effect using a Hall element or the like has a greater durability than a contact type rotation angle sensor such as a potentiometer. However, since the variation of a non-contact type rotation angle sensor is greater than that of a contact type rotation angle sensor due to differences and deterioration of the magnet, learning of the conversion characteristic needs to be performed well.

Furthermore, there is a problem in that, in a low rotation angle region, in a detection method that uses a signal value where a signal from the rotation angle sensor 102 has been amplified in the amplifier 106 as described with FIG. 1, in the learning according to the afore-mentioned Japanese Unexamined Patent Publication No. 9-133039, variation in an amplifier can be learnt, but the conversion characteristic in the low rotation angle region cannot be learnt.

Consequently, in the present embodiment, the following conversion characteristic learning is performed by the above-mentioned CPU 108 in the control unit.

Figure 12:
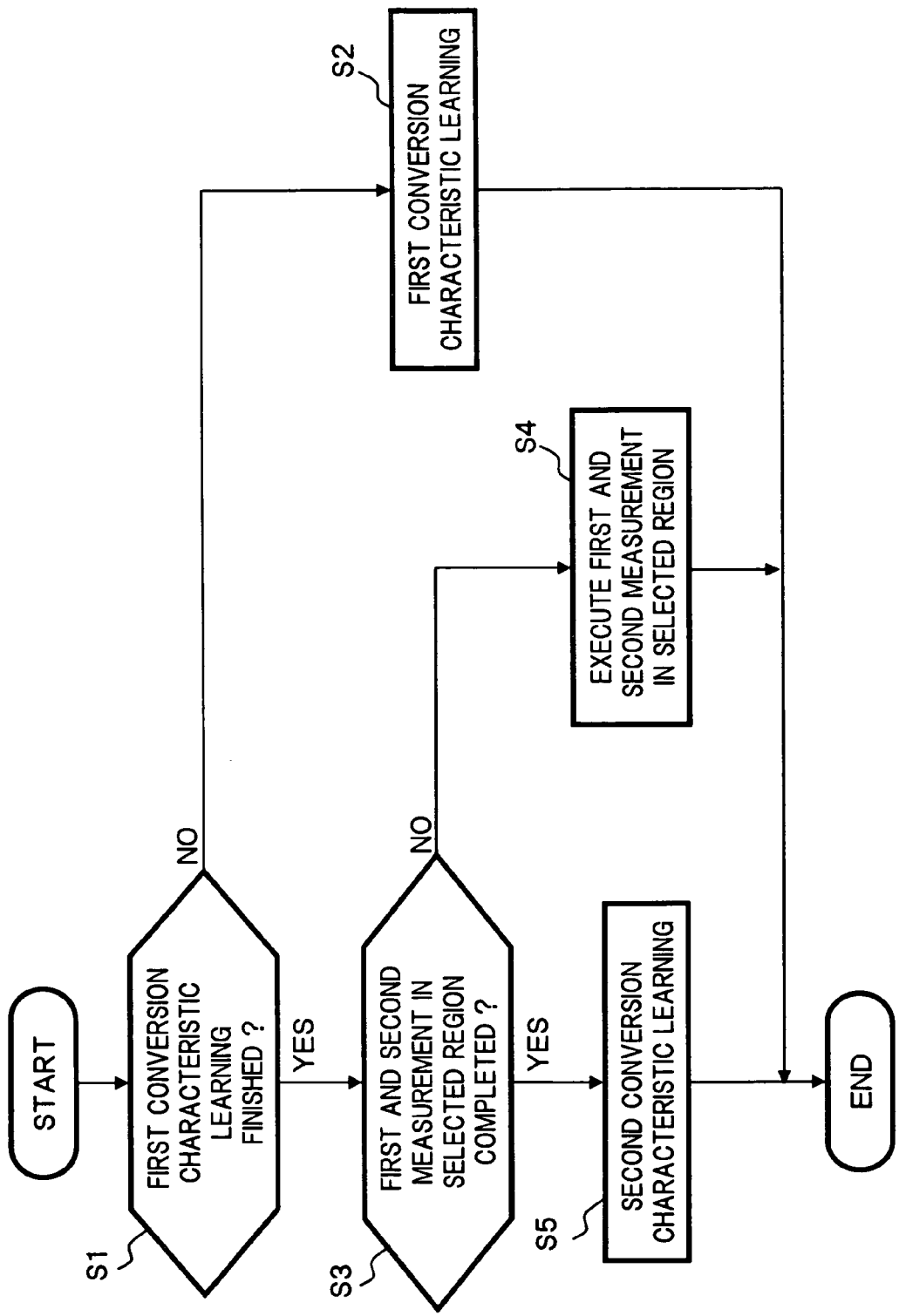
FIG. 12 is a flow chart of a learning control in the embodiment.

FIG. 12 shows a learning flow in the embodiment.

In step S1, it is determined whether or not learning of a first conversion characteristic for converting the rotation angle detection value is complete, based on a signal value from the first A/D converter 104, that is, a value that has been A/D converted without amplifying the signal from the rotation angle sensor 102.

When it is determined that learning of the first conversion characteristic learning is not complete, control proceeds to step S2, and the learning of the first conversion characteristic is executed.

Learning of the first conversion characteristic is performed as described below.

Referring to FIG. 13, based on signal values V1 and V2 that have been A/D converted by the first A/D converter 104 for two reference rotation angles of the above-mentioned control shaft 63, namely, the minimum rotation angle θ1 and the maximum rotation angle θ2, a gain dv/dθ of signal value variation ΔV with respect to rotation angle variation Δθ is calculated as in the following formula (8).

$$dv/d\theta = \Delta V/\Delta\theta = (V2-V1)/(\theta2-\theta1) \quad (8)$$

Here, the minimum rotation angle θ1 corresponds to the rotation angle of the control shaft 63 and the rotation shaft 6 for the minimum values of the operating angle and the lift amount of the intake valve, and the maximum rotation angle θ2 corresponds to the rotation angle of the control shaft 63 and the rotation shaft 6 for the maximum values of the operating angle and the lift amount of the intake valve, and both are restricted and mechanically fixed by a stopper (not shown in the diagram) provided in the variable valve operating mechanism 101.

The signal value (A/D conversion value) V1 (V2) for the minimum rotation angle θ1 (and maximum rotation angle θ2) is learnt by the above learning at the same time, and a rotation angle detection value θ for an optional signal value V is found by the following formula (9).

$$(V-V1)/(\theta-\theta1) = dv/d\theta \rightarrow \theta = \theta1 + (V-V1)/(dv/d\theta) \quad (9)$$

When learning of the first conversion characteristic is thus complete, the determination of step S1 becomes YES, and control proceeds to step S3 and the subsequent processes, and learning of a second conversion characteristic for converting the rotation angle detection value is performed based on the signal value from the second A/D converter 107, that is, a value for where a signal from the rotation angle sensor 102 is amplified a predetermined number of times and then A/D converted.

At first, in step S3, it is determined whether or not measurement of two different rotation angles for the signal that has not been amplified and the signal that has been amplified a predetermined number of times has been performed within a rotation angle region where the rotation angle detection value due to the second conversion characteristic is selected. If measurement has not been performed, control proceeds to step S4, and measurement for the two rotation angles for the signal value that has not been amplified and the signal value that has been amplified a predetermined number of times is performed.

Determination of the rotation angle region may be carried out, for example, by comparing the signal value that has been converted by the first A/D converter 104 (or the second A/D converter 107) with a threshold value corresponding to the region switching point.

Here, the region switching point (threshold value) is set as shown in FIG. 13, by setting a predetermined rotation angle that is smaller than the rotation angle at which the rotation angle detection value obtained by the second A/D converter 107 becomes a maximum output value (saturation point), as an upper limit (region switching point) for selecting the rotation angle detection value by the second A/D converter 107, or as shown in FIG. 14, by setting a rotation angle at which the rotation angle detection value obtained by the second A/D converter 107 becomes a maximum output value (saturation point), as an upper limit (region switching point) for selecting the rotation angle detection value by the second A/D converter 107. Moreover, the two different rotation angles are optional. However, in terms of accuracy, it is preferable to set two points that are distant as far from each other as possible within the range of the rotation angle region where the rotation angle detection value due to the second conversion characteristic is selected.

If this is done, then by using the rotation signal detection value that has been amplified to the maximum output value that can be detected by the second A/D converter 107, or a value proximate thereto, control and learning accuracy in the low rotation angle region is improved.

When the measurement is complete, the determination of step S3 becomes YES, and control to proceeds to step S5, and learning of the second conversion characteristic is performed as described below based on the measurement result in step S4.

If the smaller rotation angle of the above two rotation angles is $\theta_{min}$, and the greater one is $\theta_{max}$, and the signal values that have been A/D converted by the first A/D converter 104 are $V_{min}$ and $V_{max}$, and the signal values that have been A/D converted by the second A/D converter 107 after they had been amplified a predetermined number of times (n times) are $Vn_{min}$ and $Vn_{max}$, a gain $dvn/d\theta n$ of a signal value variation $\Delta V$ with respect to the rotation angle variation $\Delta\theta$ in the second conversion characteristic is expressed by the following formula (10).

$$dvn/d\theta n = (Vn_{max} - Vn_{min})/(\theta_{max} - \theta_{min}) \quad (10)$$

Here, the above $(\theta_{max} - \theta_{min})$ is calculated by the following formula (11) using the learnt gain $dv/d\theta$ of the first conversion characteristic, and the signal values $V_{min}$ and $V_{max}$.

$$\theta_{max} - \theta_{min} = dv/d\theta \cdot (V_{max} - V_{min}) \quad (11)$$

Consequently, $(\theta_{max} - \theta_{min})$ calculated by the formula (11) is substituted into the abovementioned formula (10), and the gain $dvn/d\theta n$ of the second conversion characteristic is learnt.

By using the gain $dvn/d\theta n$ learnt in this way, the rotation angle detection value $\theta$ due to the second conversion characteristic is calculated as in the following formula (12).

$$(Vn - Vn_{min})/(\theta - \theta_{min}) = dnv/dn\theta \rightarrow \theta = \theta_{min} + (Vn - Vn_{min})/(dnv/dn\theta) \quad (12)$$

Alternatively, it may be calculated as in the following formula (13).

$$(Vn_{max} - Vn)/(\theta_{max} - \theta) = dnv/dn\theta \rightarrow \theta = \theta_{max} - (Vn_{max} - Vn)/(dnv/dn\theta) \quad (13)$$

Furthermore, it may be calculated as in the following formula (14), using the A/D conversion value $Vn1$ by the second A/D converter at the minimum rotation angle $\theta1$ that has been set separately from the above, or that has been selected as $\theta_{min}$.

$$\theta = \theta_{min} + (Vn - Vn1)/(dnv/dn\theta) \quad (14)$$

As described above, the rotation angle is detected by selecting either one of the first conversion characteristic and second conversion characteristic for each rotation angle region while periodically and sequentially learning the first conversion characteristic and the second conversion characteristic.

If this is done, then after learning of the first conversion characteristic, learning of the second conversion characteristic, using an amplified signal value can be accurately executed together with learning of variation of the amplification characteristic of the amplifier and variation of sensor output characteristic, and therefore a high accuracy in the rotation angle detection can be maintained over the entire rotation angle region.

Moreover, since learning of the second conversion characteristic is performed using the learnt first conversion characteristic, continuity of the rotation angle detection value at the characteristic switching point can also be maintained.

Furthermore, since the above-mentioned reference rotation angles are made the minimum rotation angle and the maximum rotation angle at which the above rotating bodies are mechanically fixed, by using a plurality of rotation angles at which the rotating bodies are fixed and the sensor output is stabilized, and which are maximally distanced from each other, the first conversion characteristic can be learned at a high level of accuracy.

Regarding the present invention, in a device as in the abovementioned embodiment, that uses a rotation angle sensor of the magnetoelectric conversion type, the signal value/rotation angle conversion characteristic is likely to change due to differences in and deterioration of the magnet of the sensor. Therefore, the effect of learning is particularly significant. However, naturally the present invention can also be applied to a device that uses a rotation angle sensor of a contact type such as a potentiometer.

Furthermore, in addition to a device that detects as a rotation angle, the control shaft rotation angle corresponding to an operating angle of the intake valve (or exhaust valve) as described in the embodiment, the present invention can be applied to any device that rotates within a predetermined rotation angle range, such as one that detects a throttle opening and so forth.

The entire contents of Japanese Patent Application No. 2005-145913, filed May 18, 2005 are incorporated herein by reference.

While only selected embodiments have been chosen to illustrate and describe the present invention, it will be apparent to those skilled in the art from this disclosure that various change and modification may be made herein without departing from the scope of the invention as defined in the appended claims.

Furthermore, the foregoing description of the embodiments according to the present invention is provided for illustration purpose only, and not for the purpose of limiting the invention as defined by the appended claims and their equivalents.

I claim:

1. A rotation angle detecting apparatus for detecting a rotation angle of a rotating body, comprising:
   a rotation angle sensor configured to output a rotation angle signal according to a rotation angle of a rotating body; and
   a control unit which comprises:
   a first conversion section that converts a rotation angle signal outputted by said rotation angle sensor into a rotation angle detection value, based on a signal value of the rotation angle signal as is;
   an amplifying section that amplifies the rotation angle signal a predetermined number of times;
   a second conversion section that converts the rotation angle signal into a rotation angle detection value based on a signal value of said amplified rotation angle signal;
   a selection section that selects according to a rotation angle region, either one of a rotation angle detection value converted by the first conversion section, and a rotation angle detection value converted by the second conversion section, and outputs the selected rotation angle detection value as a final rotation angle detection value;
   a first learning section that learns a conversion characteristic in the first conversion section, based on rotation angle detection values for where rotation angle detection signals at at least two reference rotation angles are converted by the first conversion section, and reference-rotation-angle-equivalent-values set beforehand; and a second learning section that learns, as to at least two optional rotation angles in a rotation angle region in which the rotation angle detection value of the second conversion section is selected, a conversion characteristic in said second conversion section, based on rotation angle detection values converted by said first conversion section which has been learned by said first learning section, and the signal values amplified said predetermined number of times.

2. A rotation angle detecting apparatus according to claim 1, wherein
said reference rotation angles are a minimum rotation angle and a maximum rotation angle at which said rotating body is mechanically fixed.

3. A rotation angle detecting apparatus according to claim 1, wherein learning in said second learning section includes learning of gain $dVn/d\theta n$ of a signal value Vn amplified a predetermined number of times, with respect to a rotation angle detection value $\theta n$ converted by the second conversion section, which is calculated by the following formula, based on rotation angle detection values $\theta_{max}$, $\theta_{min}$ due to conversion of two rotation angles by the first conversion section, and signal values $Vn_{max}$, $Vn_{min}$ due to amplifying of the two rotation angles a predetermined number of times:

$$dVn/d\theta n = (Vn_{max} - Vn_{min})/(\theta_{max} - \theta_{min}).$$

4. A rotation angle detecting apparatus according to claim 1, wherein
said selection section sets a predetermined rotation angle which is smaller than a rotation angle at which a rotation angle detection value of the second conversion section becomes a maximum output value, as an upper limit of a rotation region in which the rotation angle detection value of the second conversion section is selected.

5. A rotation angle detecting apparatus according to claim 1, wherein
said selection section sets a rotation angle at which a rotation angle detection value of the second conversion section becomes a maximum output value, as an upper limit of a rotation region in which the rotation angle detection value of the second conversion section is selected.

6. A rotation angle detecting apparatus according to claim 1, wherein
the rotation angle detecting apparatus is an apparatus that detects a rotation angle corresponding to an operating angle of a control shaft in a variable valve operating mechanism which changes at least an operating angle and a lift amount of an engine valve.

7. A rotation angle detecting apparatus according to claim 1, wherein
said rotation angle sensor comprises a non-contact type sensor which converts a magnetic force into electric power to detect a rotation angle.

8. A rotation angle detecting apparatus according to claim 1, wherein learning of the conversion characteristic in the first learning section and the second learning section learns gain of a signal value variation with respect to a rotation angle variation, and thereafter learns a conversion formula for converting signal values for two points into rotation angle detection values, based on the learnt gain and the signal values.

9. A rotation angle detecting apparatus for detecting a rotation angle of a rotating body, comprising:
a rotation angle sensor configured to output a rotation angle signal according to a rotation angle of a rotating body;
a first conversion means for converting a rotation angle signal outputted by said rotation angle sensor into a rotation angle detection value, based on a signal value of the rotation angle signal as is;
an amplifying means for amplifying the rotation angle signal a predetermined number of times;
a second conversion means for converting the rotation angle signal into a rotation angle detection value based on a signal value of said amplified rotation angle signal;
a selection means for selecting according to a rotation angle region, either one of a rotation angle detection value converted by the first conversion section, and a rotation angle detection value converted by the second conversion section, and for outputting the selected rotation angle detection value as a final rotation angle detection value;
a first learning means for learning a conversion characteristic in the first conversion section, based on rotation angle detection values for where rotation angle detection signals at at least two reference rotation angles are converted by the first conversion section, and reference-rotation-angle-equivalent-values set beforehand; and
a second learning means for learning, as to at least two optional rotation angles in a rotation angle region in which the rotation angle detection value of the second conversion section is selected, a conversion characteristic in said second conversion section, based on rotation angle detection values converted by said first conversion section which has been learned by said first learning section, and the signal value amplified said predetermined number of times.

10. A rotation angle detecting method for detecting a rotation angle of a rotating body, comprising the steps of:
outputting a rotation angle signal according to a rotation angle of a rotating body;
executing a first conversion to convert the rotation angle signal into a rotation angle detection value, based on a signal value of the rotation angle signal as is;
amplifying the rotation angle signal a predetermined number of times;
executing a second conversion to convert the rotation angle signal into a rotation angle detection value based on a signal value of said amplified rotation angle signal;
selecting, according to a rotation angle region, either one of the rotation angle detection value converted by the first conversion, and the rotation angle detection value converted by the second conversion, and outputting the selected one as a final rotation angle detection signal;
executing a first learning to learn a conversion characteristic in the first conversion, based on rotation angle detection values for where rotation angle detection signals at at least two reference rotation angles are converted by the first conversion, and reference-rotation-angle-equivalent-values set beforehand; and
executing a second learning to learn, as to at least two optional rotation angles in a rotation angle region in which the rotation angle detection value converted by said second conversion is selected, a conversion characteristic in said second conversion, based on rotation angle detection values for where rotation angle detection signals are converted by said first conversion which has been learned in said first teaming, and the signal value amplified said predetermined number of times.

11. A rotation angle detecting method according to claim 10, wherein
the reference rotation angles are a minimum rotation angle and a maximum rotation angle at which said rotating body is mechanically fixed.

12. A rotation angle detecting method according to claim 10, wherein the second learning includes learning of gain $dVn/d\theta n$ of a signal value $Vn$ amplified a predetermined number of times, with respect to a rotation angle detection value $\theta n$ converted by the second conversion, which is calculated by the following formula, based on rotation angle detection values $\theta_{max}$, $\theta_{min}$ due to conversion of two rotation angles by the first conversion, and signal values $Vn_{max}$, $Vn_{min}$ due to amplifying of the two rotation angles a predetermined number of times:

$$dVn/d\theta n=(Vn_{max}-Vn_{min})/(\theta_{max}\theta_{min}).$$

13. A rotation angle detecting method according to claim 10, wherein
the step for selecting the rotation angle detection value sets a predetermined rotation angle which is smaller than a rotation angle at which a rotation angle detection value converted by the second conversion becomes a maximum output value, as an upper limit of a rotation region in which the rotation angle detection value converted by the second conversion is selected.

14. A rotation angle detecting method according to claim 10, wherein
said step for selecting said rotation angle detection value sets a rotation angle at which a rotation angle detection value converted by the second conversion becomes a maximum output value, as an upper limit of a rotation region in which the rotation angle detection value of the second conversion is selected.

15. A rotation angle detecting method according to claim 10, wherein
the rotation angle detecting method is a method that detects a rotation angle corresponding to an operating angle of a control shaft in a variable valve operating mechanism which changes at least an operating angle and a lift amount of an engine valve.

16. A rotation angle detecting method according to claim 10, wherein
the step for outputting a rotation angle signal, outputs a rotation angle signal using a non-contact type sensor which converts a magnetic force into electric power to detect a rotation angle.

17. A rotation angle detecting method according to claim 10, wherein
learning of the conversion characteristic in the first and second learning steps learns gain of a signal value variation with respect to rotation angle variation, and thereafter learns a conversion formula for converting a signal value into a rotation angle detection value, based on the gain and signal values for two points.

* * * * *